United States Patent [19]
Weber

[11] 4,376,655
[45] Mar. 15, 1983

[54] PRODUCTION OF AN OPTICALLY EFFICIENT TITANIUM SLURRY

[75] Inventor: Leon Weber, Baltimore, Md.

[73] Assignee: SCM Corporation, New York, N.Y.

[21] Appl. No.: 349,477

[22] Filed: Feb. 17, 1982

[51] Int. Cl.³ ............................................... C09C 1/36
[52] U.S. Cl. .................................................... 106/300
[58] Field of Search .......................................... 106/300

[56] References Cited
U.S. PATENT DOCUMENTS

| | | | |
|---|---|---|---|
| 2,671,031 | 3/1954 | Whately | 106/300 |
| 2,868,663 | 1/1959 | Jarmus et al. | 106/193 |
| 3,212,911 | 10/1965 | Berstein et al. | 106/300 |
| 3,459,575 | 8/1969 | Andrew et al. | 106/300 |
| 3,510,334 | 5/1970 | Goodspeed | 106/300 |
| 4,050,951 | 9/1977 | Piccolo et al. | 106/300 |

Primary Examiner—James Poer
Attorney, Agent, or Firm—Robert A. Sturges; Merton H. Douthitt

[57] ABSTRACT

An aqueous slurry of titanium dioxide characterized by the presence therein of amorphous aluminum hydroxide, and a process for producing the same.

7 Claims, 2 Drawing Figures

PRODUCTION OF AN OPTICALLY EFFICIENT TITANIUM SLURRY

The present invention is a process for producing an optically efficient titanium dioxide slurry, and more particularly an optically efficient anatase titanium dioxide slurry.

BACKGROUND OF THE INVENTION AND PRIOR ART

Several procedures have been described in the art for improving the optical efficiency of pigment slurries for application to paper products or incorporation into other coating materials. Typically, these procedures involve surface treating the titanium particles present in the slurry with a secondary compound such as alumina, silica, magnesia, or the like or a combination of these. Exemplary of this art are U.S. Pat. Nos. 2,868,663, 2,671,031, 3,510,334, and 4,050,951. According to U.S. Pat. No. 2,868,663, titanium dioxide pigment can be surface treated with a metal oxide by introducing a salt of aluminum, titanium, silicon, zirconium, or a mixture thereof, precipitating the salt onto the titanium dioxide pigment and subsequently washing to remove any soluble salts. The surface treated pigment is then dried before use. U.S. Pat. No. 2,671,031 describes the use of an ionizable aluminum compound to coat pigment particles. However, again, the pigment is dried by baking at an elevated temperature prior to use. Similarly, U.S. Pat. Nos. 3,510,334 and 4,050,951 teach the production of dry coated pigments either by a dry method or a slurry method. However, in each case if a wet slurry product is to be produced, the pigment is first treated, dried and then reslurried to make the wet slurry product.

The drying step has heretofore been thought to be required when treating $TiO_2$ particles with aluminum, titanium, silicon, zirconium, or magnesium compounds to improve optical efficiency, the drying being an essential step in surface treating the pigment's particles with the optical efficiency improving compound. Where the surface treating agent was aluminum based, the surface became treated with essentially crystalline aluminum oxide.

It has now been found that a titanium dioxide slurry with improved optical efficiency can be produced directly by blending a particulate $TiO_2$ material with an amorphous aluminum hydroxide and water to form a wet slurry. Drying or otherwise attempting to precipitate the aluminum hydroxide as a coating on the particles is not required.

It is an object and advantage of the present invention to produce wet pigmented slurries through a simplified blending process as distinct from conventional surface treatment of $TiO_2$ pigments.

It is a further object and advantage of the present invention to produce anatase $TiO_2$ slurries in a more economical fashion, and to upgrade the anatase $TiO_2$ pigment in such slurries in terms of its relative brightness.

It is a still further object and advantage of the present invention to improve the optical efficiency of wet pigment slurries. Still other objects and advantages of the present invention will become more apparent from the detailed description of the invention.

SUMMARY OF THE INVENTION

The present invention is a process for preparing an aqueous slurry of titanium dioxide having improved optical efficiency which comprises blending titanium dioxide and an amorphous aluminum hydroxide and water, to produce the slurry. Drying of the slurry to coat the aluminum hydroxide on the pigment particles is not required.

DETAILED DESCRIPTION OF THE INVENTION

The present invention is a process for preparing a slurry of titanium dioxide, aluminum hydroxide, and water. Such slurries have primary application for coating paperboard products; however, they find additional applications in the coating of fine papers and for incorporation in other water-based coating products.

Figure 1:
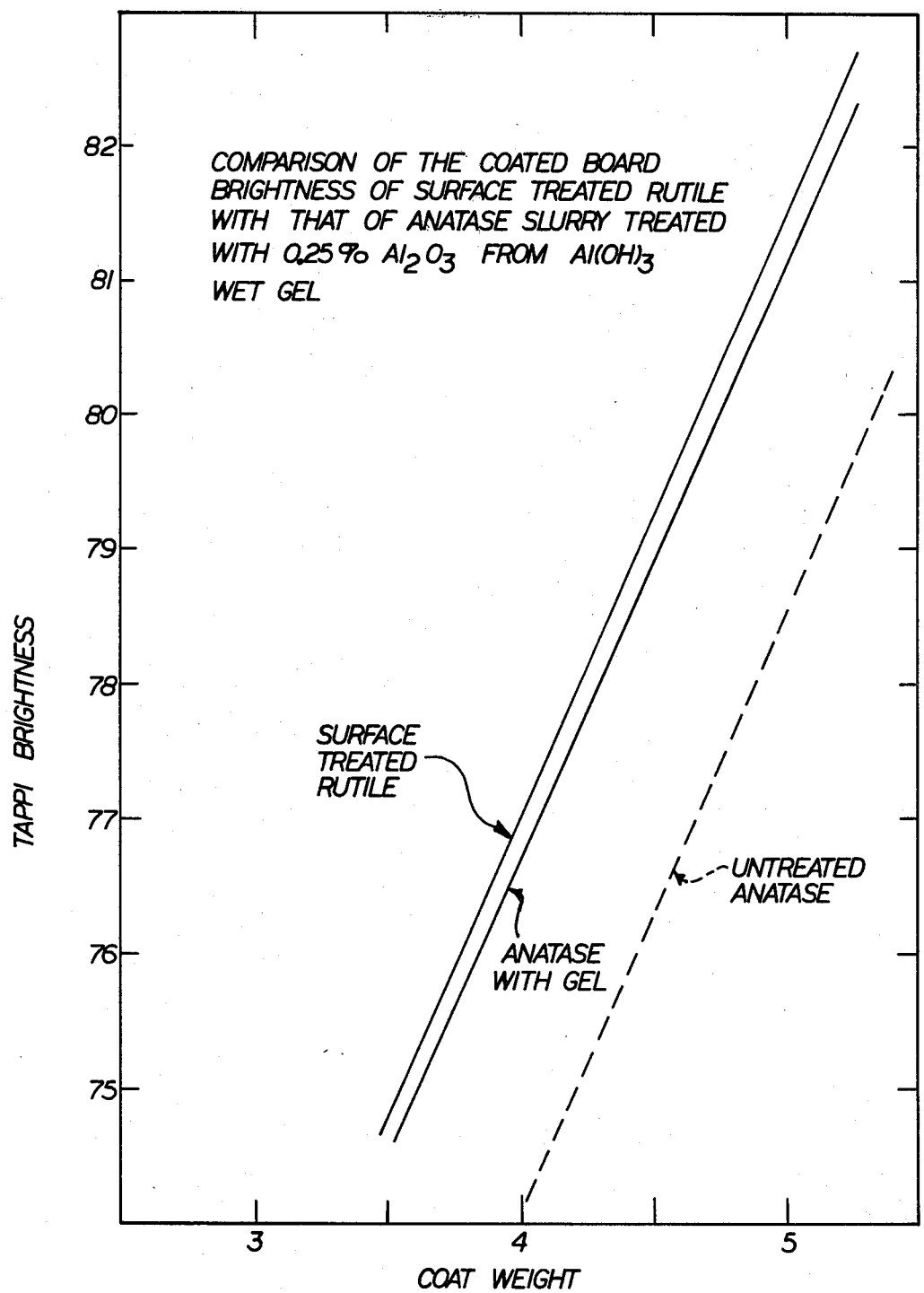
FIG. 1 is a graph comparing brightness, by the TAPPI procedure, of surface treated rutile slurry coated board with slurry coated boards using anatase $TiO_2$ treated in accordance herewith and untreated calciner exit anatase.

FIG. 1 illustrates graphically the value of the present invention. Surface treated rutile $TiO_2$ wherein the pigment has crystalline $Al_2O_3$ with or without $SiO_2$ on the surface is used currently for coated boards and paper. This material is a surface coated rutile titanium dioxide having a crystalline form of $Al_2O_3$ on the surface thereof. This is for such purposes as whiteness, and anti-agglomeration. Untreated anatase $TiO_2$ and particularly calciner discharge anatase $TiO_2$ as shown in FIG. 1 by a dotted line, is generally inferior to the rutile $TiO_2$ in terms of brightness on a coated board. By means of the present invention, anatase $TiO_2$ can be upgraded to near equivalence with the rutile $TiO_2$ and compete favorably with the rutile $TiO_2$ as a slurry pigment. This is shown in FIG. 1 by the two closely spaced solid parallel lines.

The pigmentary titanium dioxide useful in the present invention is preferably anatase. The anatase particularly preferred for use in the present invention is produced according to the sulfate process for making pigmentary titanium dioxide. Although the invention is of particular value in treating anatase $TiO_2$, rutile $TiO_2$ can also be improved in terms of its brightness by the same process. Economically, it is not presently necessary to do so.

The final particle size of the $TiO_2$ particles contained in the slurry composition should be between about 0.1 $\mu$ and about 2 $\mu$. However, it is contemplated that a larger particle might be introduced into the blend and particle size reduction occur during the blending process. For example, calciner discharge from commercial anatase titania production may be directly blended with water and amorphous aluminum hydroxide gel and subsequently milled together to form the slurry. The particle size of such calciner discharge is typically about 0.2 $\mu$; however, it can range from about 0.1 $\mu$ to about 0.3 $\mu$.

The aluminum hydroxide gel introduced into the blend must be amorphous. The gel need not be salt-free, although for certain purposes a substantially salt-free amorphous $Al(OH)_3$ gel is desired. The term "salt-free"

is used herein and means that such compounds should contain less than about 2.0% total salts and preferably less than about 1.4% total salts. The presence of salt affects the viscosity of the slurry; it does not affect relative brightness. This gel can be either a pumpable dispersion containing 9-10% Al(OH)$_3$ as alumina and water or a dried gel containing 50-55% alumina and water. Of course, higher and lower water concentrations in the alumina gel are possible so long as the overall water content in the slurry is maintained.

A convenient source of amorphous aluminum oxide is the aluminum hydroxide gel used in pharmaceutical preparations for the control of gastric hyperacidity. These aluminum hydroxide gels are amorphous with poorly defined structures. To maintain the amorphous character and to assist in rapid and extensive acid neutralization, these gels usually contain appreciable quantities of occluded carbonate in their structure; they might even be called aluminum hydroxycarbonates (Bardosey et al, Science, Vol. 203 pp. 355-356 (1979); Serna et al, J. Pharm. Sci. 59, (3), pp. 317-321 (1970)). When such a pharmaceutical grade gel is introduced into an anatase slurry so that the gel contributed 0.25% by weight Al$_2$O$_3$ on a TiO$_2$ basis, the resultant slurry showed results quite comparable to surface treated rutile TiO$_2$ slurry. (See FIG. 1).

A particular sample of the pharmaceutical grade wet aluminum hydroxide gel used was a fluid material that contained 10.4 wt % Al$_2$O$_3$ and was supplied by Chattem Chemicals Co. It was used without further dilution. Evaluation of pigment slurries in coated board application was rated by a relative brightness procedure described below. Essentially a relative brightness equal to or less than 1.0 is desirable and considered a favorable result. Slurries were tested at various concentrations and in the presence of various dispersants. Table I summarizes the results and shows that the wet gel treated anatase slurries relative to unmodified surface treated rutile slurries performed quite well. In every case, the anatase pigment slurry containing amorphous aluminum hydroxide gel performed considerably better than the unmodified anatase control Sample No. 8. Because the pharmaceutical grade of gel is expensive for use in pigment slurries, other sources of gel were explored.

TABLE I
EFFECT OF Al(OH)$_3$ WET GELS ON ANATASE SLURRIES

| Sample Number | % Al$_2$O$_3$ Added | % Dispersants | % Solids | pH | Viscosity cps | Relative Brightness Coated Board |
|---|---|---|---|---|---|---|
| 1 | 0.25 | 0.3 AMP* | 71.4 | 9.5 | 738 | 0.4 |
| 2 | 0.25 | 0.2 AMP, 0.1 KTPP** | 71.4 | 9.3 | 714 | 0.9 |
| 3 | 0.50 | 0.3 AMP | 72.0 | 9.4 | 808 | −0.4 |
| 4 | 0.25 | 0.3 MIPA*** | 71.9 | 9.4 | 704 | 0.0 |
| 5 | 0.50 | 0.6 MIPA | 69.8 | 9.8 | 644 | 0.8 |
| 6 | 0.50 | 0.6 MIPA | 71.7 | 9.5 | 1064 | 0.0 |
| 7 | 0.60 | 0.64 MIPA | 72.6 | 9.6 | 1168 | −0.5 |
| 8 | 0.0 | 0.6 MIPA | 71.2 | 10.1 | 924 | 2.3 |

*AMP = 2-amino-2-methyl-1-propanol
**KTPP = Potassium tripolyphosphate
***MIPA = Monoisopropylamine There are a number of fairly pure commercial alumina products which are priced considerably less than the pharmaceutical gels. These aluminas when examined by X-ray diffraction produce rather distinct diffraction patterns indicating a crystalline morphology, whereas the pharmaceutical aluminum hydroxide gels are almost completely amorphous, i.e., they do not produce a distinct X-ray pattern. The crystalline aluminas which were evaluated represent several polymorphic modifications of alumina. The materials investigated were aluminum trihydrate as gibbsite, two substrate aluminas both boehmites, and two experimental aluminas, one of which was eta alumina and the other was boehmite. The data of Table II show that all of these crystalline materials are essentially inert and produce slurries whose relative brightness is poor and comparable to the control sample of Table I. (Sample No. 8).

TABLE II

| Sample Number | % Al$_2$O$_3$ Added | Crystalline Form | % Dispersant | Slurry Solids % | Slurry pH | Slurry Visc. cps | Relative Brightness |
|---|---|---|---|---|---|---|---|
| 9 | 1.0 | Gibbsite | 0.3 AMP | 72.1 | 9.6 | 820 | 2.7 |
| 10 | 1.0 | Gibbsite | 0.3 MIPA | 72.2 | 9.6 | 852 | 2.0 |
| 11 | 0.5 | Gibbsite | 0.3 AMP | 72.0 | 9.6 | 868 | 1.5 |
| 12 | 0.5 | Boehmite | 0.64 MIPA | 72.5 | 10.1 | 1190 | 2.0 |
| 13 | 0.5 | Boehmite | 0.64 MIPA | 72.6 | 10.1 | 1164 | 2.5 |
| 14 | 0.5 | Eta | 0.64 MIPA | 72.6 | 10.2 | 1030 | 2.2 |
| 15 | 0.5 | Boehmite | 0.64 MIPA | 72.9 | 10.0 | 1862 | 1.9 |

As indicated above, the amorphous aluminum hydroxide gels from pharmaceutical sources contained occluded carbonate. It became desirable to determine the importance of carbonate, if any. Gels were prepared at ambient temperatures in several ways for comparative purposes. In a first case, an aluminum sulfate solution was added to a solution of sodium carbonate, and in a second case the sodium carbonate was added to the solution of aluminum sulfate. Both reactions were conducted so that the final pH was 6.6. After the aluminum hydroxide gel preparations were washed with 5 to 10 volumes of water and suspended back in water, the pH reflected the initial pH environment of the reaction. In the case of the first reaction, (Example 16) the suspension was basic while the opposite reaction (Example 17) was acidic. Portions of Examples 16 and 17 were dried at 110° C. and analyzed and the results are set forth in Table III below.

A third gel (Example 18) listed in Table III was prepared in a carbonate-free environment by slowly adding an aqueous ammonia solution to an aqueous solution of aluminum sulfate. The resulting Al(OH)$_3$ gel was washed in 5 to 10 volumes of water and after being redispersed in water produced an acidic suspension. The analysis of a portion of the gel washed and oven dried at 110° C. revealed appreciable occluded sulfate. The results of including gels 16, 17 and 18 in anatase slurries and used for coated board showed results as indicated in Table IV below. The relative brightness of all three aluminum hydroxide gel treated slurries was excellent. The viscosities of the slurries were only slightly too high for practical application. The filter cakes were, however, difficult to wash.

TABLE III
PREPARATION OF Al(OH)₃

| Run Number | Method of Reaction | Final pH | pH of Gel Suspension | Analysis of 110° C. Dried Gel % Na | % SO₄ |
|---|---|---|---|---|---|
| 16 | Al₂(SO₄)₃ to Na₂CO₃ | 6.6 | 7.4 | 10.82 | 2.05 |
| 17 | Na₂CO₃ to Al₂(SO₄)₃ | 6.6 | 5.9 | 1.03 | 16.04 |
| 18 | NH₄OH to Al₂(SO₄)₃ | 6.5 | 5.2 | 40 ppm | 20.44 |

TABLE IV
COATED BOARD EVALUATION OF Al(OH)₃ PREPARATION IN ANATASE SLURRIES

| Sample Number | % Al₂O₃ Added | % Dispersants | % Solids | pH | Viscosity cps | Relative Brightness |
|---|---|---|---|---|---|---|
| 16 | 0.50 | 0.64 MIPA | 72.3 | 9.4 | 3610 | 0.0 |
| 17 | 0.50 | 0.64 MIPA | 72.3 | 9.4 | 1548 | −0.2 |
| 18 | 0.50 | 0.64 MIPA | 72.5 | 9.6 | 1586 | 0.1 |

A highly satisfactory amorphous aluminum hydroxide gel that washed rapidly, contained a low concentration of occluded salt, and was effective for improving the optical brightness of anatase slurries is produced as follows:

EXAMPLE 19

A 244.0 g sample of commercial 32° Baume aluminum chloride solution was placed into a reservoir connected to a Cole-Parmer Masterflex tubing pump. A second reservoir, also connected to a tubing pump, was loaded with a solution of sodium carbonate (120.0 g Na₂CO₃ in 1000 ml deionized water). The aluminum chloride pump was adjusted to flow at approximately 8 ml/min so that the reservoir would empty in 30 minutes. The sodium carbonate pump was adjusted during the experiment to keep the pH of the reaction vessel at approximately 5.6. Since slightly more than 700 ml of sodium carbonate solution was consumed in this experiment, the pump effectively flowed at 23.5 ml/min. Prior to the start of the two pumps, 1600 ml of deionized water was placed into the 4 liter reaction vessel. The reaction vessel also contained a pH electrode and a Lightnin mixer which continuously agitated the system during the reaction.

When the aluminum chloride reservoir was emptied, both pumps were stopped and the aluminum hydroxide gel was transferred to a Buchner funnel where it washed very rapidly with four 100 ml portions of deionized water. The washed filter cake was transferred to a beaker where approximately 50 ml of deionized water was added and the mixture was liquified with rapid mechanical mixing. The pH of this suspension was 5.5 and its Al₂O₃ content was found (after ignition at 800° C.) to be 7.7 percent. A portion of the filter cake, dried at 110° C. revealed a low occluded salt concentration, 1.42% sodium and 2.30% chloride. The washed gel was easily dispersed in water at a higher solids concentration than with any of the other gels prepared. The relative brightness of a slurry coated board was 0.3 comparable to the best gels (pharmaceutical gels).

In the foregoing examples, the gels that have been used were wet gels. It has been found that dried pharmaceutical gels (approximately 53% Al₂O₃) can also be used with equivalent results for improving brightness of TiO₂ slurry coated boards. Table V below shows the test results of anatase slurries which contained dried Al(OH)₃ pharmaceutical gels from various sources indicated by capital letters.

TABLE V
EVALUATION OF ANATASE SLURRIES CONTAINING PHARMACEUTICAL Al(OH)₃ DRIED GELS

| Sample Number | % Al₂O₃ Present | Source of Dried Gel | Dispersant % MIPA | % Solids | pH | Visc. cps | Relative Brightness |
|---|---|---|---|---|---|---|---|
| 20 | 0.55 | A | 0.60 | 71.9 | 10.1 | 788 | 0.1 |
| 21 | 0.52 | B | 0.60 | 71.9 | 10.0 | 828 | −0.3 |
| 22 | 0.58 | C | 0.64 | 72.6 | 10.0 | 950 | −0.6 |
| 23 | 0.49 | B | 0.64 | 72.5 | 10.0 | 948 | −0.4 |

Commercially available anatase TiO₂ slurries contain about 2.5% of kaolinite extender, and it was determined to be desirable to continue the inclusion of clay in commercial embodiments of this invention. Hence, it became important to determine the effect, if any, of clay extenders on the system including an amorphous aluminum hydroxide gel. A series of tests as set forth in Table VI below indicated clearly that the beneficial effects of Al(OH)₃ dried gels were not adversely affected by the presence of clay. For best results, the Al(OH)₃ dried gel should be mixed in the aqueous medium before or with the TiO₂ component prior to the addition of clay. (See Table VII). The Table VI also shows that there is little or no difference between using deionized water and tap water in preparing the slurries.

TABLE VI
EVALUATION OF ANATASE SLURRIES CONTAINING Al(OH)₃ DRIED GEL AND CLAY

| Sample Number | % Al₂O₃ Added | % Clay Added | % MIPA Dispersant | % Solids | pH | Viscosity cps | Relative Brightness |
|---|---|---|---|---|---|---|---|
| 24 | 0.0 | 2.5 | 0.60 | 71.7 | 10.0 | 980 | 2.1 |
| 25 | 0.5 | 2.5 | 0.60 | 72.1 | 10.0 | 848 | 0.4 |
| 26 | 0.5 | 2.5 | 0.60, Tap H₂O | 72.3 | 9.9 | 870 | 0.3 |
| 27 | 0.5 | 3.1 | 0.64 | 72.3 | 10.0 | 872 | 0.2 |
| 28 | 0.5 | 3.1 | 0.64, Tap H₂O | 72.4 | 10.0 | 902 | 0.5 |
| 29 | 0.5 | 2.5 | 0.55 | 72.4 | 9.8 | 848 | −0.5 |
| 30 | 0.5 | 2.5 | 0.55 | 72.3 | 9.9 | 740 | −0.1 |
| 31 | 0.5 | 2.5 | 0.55 | 72.5 | 9.8 | 778 | 0.2 |
| 32 | 0.5 | 2.5 | 0.55 | 72.5 | 9.8 | 788 | 0.6 |

TABLE VII
EFFECT OF THE ORDER OF ADDITION OF CLAY
2.5% Clay Added
0.6% MIPA Dispersant

| Sample Number | % Al₂O₃ Added | | Slurry % Solids | Slurry pH | Slurry Viscosity cps | Relative Brightness |
|---|---|---|---|---|---|---|
| 33 | 0.5 | Clay added last | 71.2 | 9.6 | 808 | 0.1 |

TABLE VII-continued
EFFECT OF THE ORDER OF ADDITION OF CLAY
2.5% Clay Added
0.6% MIPA Dispersant

| Sample Number | % $Al_2O_3$ Added | | Slurry % Solids | Slurry pH | Slurry Viscosity cps | Relative Brightness |
|---|---|---|---|---|---|---|
| 34 | 0.5 | Clay added before $TiO_2$ | 71.2 | 9.6 | 808 | 0.7 |

Previously, it has been shown that rutile and anatase pigments surface treated with hydrous alumina provide optical brightness comparable to a commercial rutile pigment slurry in coated boards. It has also been shown that untreated anatase can be improved to equal the rutile product provided that an amorphous $Al(OH)_3$ gel is added to the pigment slurry. It is, therefore, logical to question whether non-surface-treated rutile can be affected similarly by $Al(OH)_3$ gel. A good source of rutile $TiO_2$ is the $TiO_2$ product directly from the chloride oxidizer unit. Although this oxidizer discharge $TiO_2$ contains approximately 1% $Al_2O_3$, this $Al_2O_3$ is inert or of the wrong morphology. Part of this $Al_2O_3$ is bound in the $TiO_2$ lattice and not available for this activity. The remaining part that might be on the $TiO_2$ surface has been exposed to extremely high temperatures and will be inert as with the crystalline forms previously discussed.

The oxidizer discharge $TiO_2$ is somewhat more difficult to disperse into a high solids slurry than is anatase pigment. Rutile $TiO_2$ usually requires a second dispersant, i.e., something in addition to the alkanolamines. In Table VIII, the effect of $Al(OH)_3$ on the brightness of oxidizer discharge rutile slurries is presented. It is believed that the dispersant systems, though somewhat varied, have little effect on the brightness. The main factor is the amount of $Al(OH)_3$ gel. Table VIII shows that a non-surface-treated rutile behaves just like a non-surface-treated anatase. Without any alumina compound in the system, they both give poor brightness values. However, when the two forms of $TiO_2$ are either surface treated with such alumina compound, or $Al(OH)_3$ gel is added to their slurries, they both can perform as well as surface treated rutile pigment slurry on coated board.

TABLE VIII
COATED BOARD EVALUATION OF RUTILE OXIDIZER DISCHARGE SLURRIES CONTAINING $Al(OH)_3$ GEL

| Sample Number | % $Al_2O_3$ Added | % Dispersants | % Solids | pH | Viscosity cps | Relative Brightness |
|---|---|---|---|---|---|---|
| 35 | 0.0 | 0.74 TEA 0.80 Tamol SG-1 | 75.7 | — | — | 1.4 |
| 36 | 0.25 | 0.30 AMP 0.50 Tamol SG-1 | 71.1 | 7.8 | 66 | 0.8 |
| 37 | 0.50 | 0.60 AMP 0.50 Nopcosperse 44 | 71.5 | 9.6 | 552 | 0.3 |
| 38 | 0.50 | 0.64 MIPA 0.40 $K_4P_2O_7$ | 73.1 | 9.8 | 1590 | 0.1 |

In the previous examples, the concentration of $Al(OH)_3$ gel added to the various $TiO_2$ slurries was varied from about 0.25% $Al_2O_3$ to 0.60 $Al_2O_3$ on a solids basis. Higher and lower $Al_2O_3$ concentrations gave similar results, i.e., relative brightness values less than 1.0. The data are tabulated in Table IX below. Two sets of data were prepared, one with kaolin clay and one without. It appears that higher concentrations of $Al(OH)_3$ gel give better relative brightness values. In general, as the concentration of $Al(OH)_3$ gel (calculated as $Al_2O_3$) increases, the viscosity tends to decrease except in the much higher concentrations. A graph would show a minimum viscosity in a given system (72.4% solids) at about 0.3% to 0.4% $Al_2O_3$. While satisfactory results are secured with $Al_2O_3$ concentrations ranging from 0.1% to about 2% $Al_2O_3$ in the slurry, it is preferred to use from 0.25% to 0.6% with 0.5% providing a reasonable margin of effectiveness.

TABLE IX
THE EFFECT OF THE CONCENTRATION OF $Al(OH)_3$ GEL ON THE EVALUATION OF ANATASE SLURRIES IN COATED BOARDS

| Sample Number | % $Al_2O_3$ Added | % MIPA | % Clay | % Solids | pH | Viscosity cps | Relative Brightness |
|---|---|---|---|---|---|---|---|
| 35 | 0.25 | 0.6 | 0 | 72.5 | 10.0 | 934 | 0.8 |
| 36 | 0.49 | 0.6 | 0 | 72.5 | 9.9 | 924 | 0.7 |
| 37 | 0.98 | 0.6 | 0 | 72.8 | 9.8 | 832 | 0.0 |
| 38 | 1.91 | 0.6 | 0 | 73.2 | 9.6 | 1096 | 0.3 |
| 39 | 0.06 | 0.55 | 2.5 | 72.5 | 9.9 | 996 | 0.9 |
| 40 | 0.10 | 0.55 | 2.5 | 72.4 | 9.8 | 944 | 0.7 |
| 41 | 0.20 | 0.55 | 2.5 | 72.4 | 9.8 | 916 | 0.4 |
| 42 | 0.40 | 0.55 | 2.5 | 72.3 | 9.8 | 876 | −0.3 |
| 43 | 0.30 | 0.55 | 2.5 | 72.0 | 9.8 | 844 | 0.7 |

In the paper industry it is quite common either to add calcium carbonate to anatase slurries prior to use in paper manufacture or accidentally to contaminate these slurries with calcium carbonate during handling or storage. High solids anatase slurries can be rather sensitive to calcium carbonate and begin to thicken and undergo a rapid increase in viscosity. Therefore, it is desirable for anatase slurries to possess a degree of stability in the presence of calcium carbonate.

An anatase slurry was made with a pharmaceutical $Al(OH)_3$ gel and was tested for stability in the presence of calcium carbonate according to the following procedure.

The calcium carbonate stability test was made on 70 percent solids pigment slurry by adding, 1 percent and 5 percent of calcium carbonate based on total solids. Duplicate slurry samples are prepared.

To a one-half pint, tared, glass jar, 300.0 g of $TiO_2$ slurry are added together with sufficient deionized water to reduce the slurry concentration to 70.0 percent solids according to the following equation:

$$gH_2O = \frac{(3) (\% \text{ solids})}{0.70} - 300$$

After adding the dilution water, the mixture is shaken until well mixed. An initial viscosity is determined by use of a Brookfield viscometer. Because the data need not be absolute, the specific viscometer is immaterial. But the same instrument should be used throughout the study. Discard some slurry so as to reduce the weight of the slurry in the jar back to 300.0 g.

(a) One percent calcium carbonate—To one sample add 1.6 g M-60 calcium carbonate (Mississippi Lime Company) and also add 0.7 g deionized water. Mix with mild agitation or slow stirring with a mechanical mixer for 2–3 minutes. Scrape the walls of the container and then mix for a second 2-3 minute interval. Measure viscosity after mixing and then again two hours later.

(b) Five percent calcium carbonate—To the second 300.0 g sample of 70 percent solids slurry add 7.9 g M-60 calcium carbonate and also add 3.4 g deionized water. Follow the same mixing procedure previously given.

Measure viscosity of both calcium carbonate treated samples daily. If the viscosity is changing rapidly continue daily measurements until the viscosity increases to 10,000 cps at which point discontinue the measurements. If the viscosity is changing slowly, indicating a stable system, then check the viscosity weekly for approximately four weeks.

Figure 2:
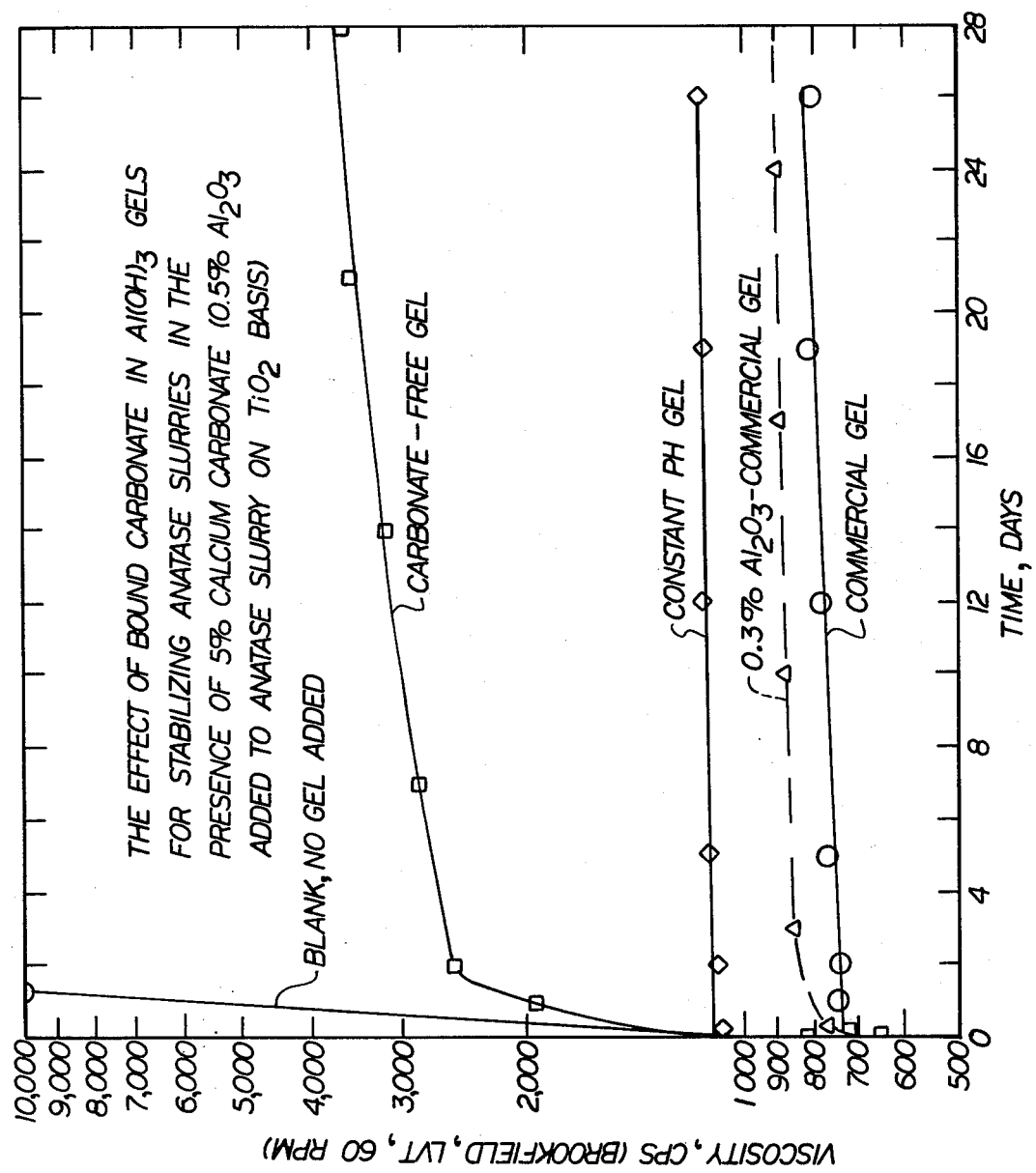
FIG. 2 is a graph showing the effect on viscosity of bound carbonate in $Al(OH)_3$ gels for stabilizing anatase slurries in the presence of added carbonate.

The stability of the foregoing anatase slurry appeared so good that a more detailed study was made to explore whether carbonate as part of the Al(OH)$_3$ gel structure was necessary to provide protection against calcium carbonate. In FIG. 2 the results of this study indicated that aluminum hydroxycarbonate contributes to slurry stability. The graphs of FIG. 2 were made with Al(OH)$_3$ gels that contained essentially no carbonate, a small amount of carbonate, and finally with the pharmaceutical gel containing considerable carbonate. As the carbonate content of the gel increases so increases the stability or resistance of the slurry to the action of calcium carbonate. A comparison is also made in FIG. 2 of the effect of two concentrations of the pharmaceutical Al(OH)$_3$ gels. The higher concentration of gel in the anatase slurry provides slightly better stability than the lower concentration. However, the lower concentration provides ample protective action for all practical situations.

The procedure for preparing coated board as used in the foregoing examples is as follows:

Commercial cylinder cardboard of 30 percent brightness was coated with the latex coating formulation given below. The coating was applied to 8 inch long by 6 inch wide sections of cardboard on a laboratory air knife sheet coater manufactured by S. D. Warren Co. In order to vary the coat weight (amount of coating per fixed surface area) the air pressure applied to the air knife was increased by 1 psig increments from a low of 5 psig to a high of 12 psig. Each evaluation, therefore, consisted of eight coated boards.

After the boards were coated they were flash dried in an oven preset to 180°-200° F. for approximately one minute. The coated boards were then conditioned for 24 hours in a constant temperature and humidity room controlled at 73° F. and 50% relative humidity.

Two 3½ inch diameter circles were cut from each conditioned board by compression between dies on an Alpha Cutter manufactured by the Thwing-Albert Instrument Company. The percent brightness of each circle was determined by averaging three readings in the direction of coating with three readings in a perpendicular direction. The brightness values were read on a Technidyne Corporation S-4 Brightness Tester and Colorimeter. The concentration of titanium dioxide in each circle was determined on a bench top X-ray fluorescence analyzer (series 9200 Portable TiO$_2$ Analyzer manufactured by the Texas Nuclear Division of the Ramsey Engineering Company). The portable analyzer was calibrated to read pounds of titanium dioxide per 1000 square feet of board. This value divided by the fractional concentration of titanium dioxide contained in a dried sample of the original coating gives the coat weight in pounds of coating per 1000 square feet of board surface. The 16 data sets (percent brightness versus coat weight) were statistically analyzed by the method of least squares. Graphs were prepared and compared to that of a standard titanium dioxide pigment. It was, however, somewhat more convenient for pigment evaluation to find the difference in the percent brightness between the standard and the test pigment at a single coat weight. This was done by substracting the value of the test sample from the value of the standard both read at the same coat weight of 5 pounds per 1000 square feet. This method of evaluation hereinafter will be called the relative brightness value. Since the experimental error of the method was approximately ±0.5%, a difference of 1.0 or less was considered approximately equivalent or better than the standard. A value greater than 1.0 would make the sample inferior to the standard.

Pigment slurries used herein were prepared as follows:

The general procedure for preparing approximately 72.5% solids anatase slurry containing 0.5% Al$_2$O$_3$ involves combining the materials stated below. These materials are added in the order listed to a 1 liter, 4" I. D. Bel-Art Products heavy walled polyethylene jar. For these experiments where various reactants or different alumina materials were tested they were always added prior to the TiO$_2$.

197.5 g deionized water
4.5 g Al(OH)$_3$ dried gel (55.9% Al$_2$O$_3$)
3.0 ml MIPA (monoisopropylamine)
500.0 g Anatase, calciner discharge
13.0 g Huber 90, clay As each component is added the system is mixed on a Cowles type dissolver equipped with a 3" Cowles blade rotating at 700–1000 rpm. After all the ingredients have been added any undispersed pigment is scraped off the blade and container wall. The mixture is then stirred at 2400 rpm for two minutes. Complete dispersion is accomplished by sand milling the mixture in a Chicago Boiler Company Red Head L-1 laboratory mill. The mixture is intensely ground with 20-30 mesh washed Ottawa sand at a sand to pigment weight ratio of 1:1. The 3" nylon impellers of the sand mill are rotated at 2400 rpm for 45 minutes during which the jacketed mill is cooled by flowing tap water. The dispersion is freed of gross sand particles by sucking it through a 60 mesh screen and then freed of finer particles by vibrating it through a 325 mesh screen. The finished slurry is analyzed by determining its pH, percent solids (from a 110° C. oven dried aliquot) and finally by measuring its viscosity with a Brookfield LVT viscometer at 60 rpm.

Suitable gels can be made from aluminum salts such as aluminum chloride, aluminum sulfate, aluminum nitrate, etc., by reacting with a base such as sodium hydroxide, potassium hydroxide, ammonium hydroxide, organic amines, or other such materials. Another process for forming aluminum hydroxide gels contemplates reacting a sodium aluminate with an acid or acidic salt such as aluminum chloride or aluminum sulfate. An additional process involves reacting alum with a base or with various soluble carbonates such as sodium carbonate. The gels can also be made from the aqueous hydrolysis of various aluminum organic compounds such as aluminum isopropoxide. In each case, however, it is required that the aluminum hydroxide gel be rendered substantially salt-free prior to introduction into the slurry blend. Conventional washing or precipitation techniques are suitable for this purpose.

The water content of the slurry is dependent primarily on the viscosity desired for the slurry and upon the total solids content desired. A typical total solids content is about 72% solids by weight. However, a solids content of as low as about 50% by weight and as high as about 77% by weight can be utilized.

It is further contemplated that conventional additives such as dispersant suspension agents, viscosity control additives, or other conventional ingredients can be used in the present slurries. For example, dispersants, such as 2-amino-2-methyl-1-propanol or potassium tripolyphosphate or monoisopropanolamine or other alkanolamines find frequent use in conventional slurries and their use is contemplated here.

It has been shown, therefore, that an amorphous colloidal aluminum hydroxide has a dramatic influence in improving the optical brightness of cardboards coated with anatase slurries. Although the mechanism controlling the phenomenon cannot be described fully, it is believed that the amorphous aluminum hydroxide gel functions in the manner of a protective colloid and improves the dispersibility of the pigment in slurries and in subsequent application products, e.g., coated boards and handsheets. This phenomenon occurs with both anatase and rutile $TiO_2$. The optical brightness of coated paper products, particularly coated board can be enhanced with as little as 0.06% aluminum hydroxide gel in the aqueous pigment slurry. The most practical range is from 0.1% to 1%. Within this range, consistently good results were secured. For these applications, the aluminum hydroxide gel can be formed in a carbonate-free environment or can be a pharmaceutical gel which is designed to contain considerable carbonate. In certain applications, such as handsheet, i.e., to provide resistance to the thickening effect of added calcium carbonate, a gel having a relatively high carbonate content, e.g., a pharmaceutical gel, is particularly useful.

What is claimed is:

1. A process for producing an aqueous slurry of titanium dioxide which comprises:
    blending particulate titanium dioxide, water, and amorphous aluminum hydroxide, and wherein the ratio of $TiO_2$ to aluminum hydroxide is between about 1000:1 and 2000:1.

2. A process as defined in claim 1 wherein the amorphous aluminum hydroxide is substantially salt-free.

3. The process of claim 1 wherein said $TiO_2$ is anatase $TiO_2$.

4. The process of claim 1 wherein said $TiO_2$ is rutile $TiO_2$.

5. The process of claim 1 wherein said $TiO_2$ is calciner discharge and has not been subjected to any further processing prior to said blending.

6. A method for improving the stability of a $TiO_2$ pigment slurry to added carbonate which comprises blending particulate titanium dioxide, water and amorphous aluminum hydroxide containing occluded carbonate, and wherein the ratio of $TiO_2$ to aluminum hydroxide is between about 1000:1 and 200:1.

7. An aqueous slurry of titanium dioxide characterized by the presence therein of amorphous aluminum hydroxide.

* * * * *